United States Patent

[11] 3,545,480

[72] Inventor Lloyd E. Gustafson
 St. Cloud, Minnesota
[21] Appl. No. 738,347
[22] Filed June 19, 1968
[45] Patented Dec. 8, 1970
[73] Assignee Dezurik Corporation
 Sartell, Minnesota

[54] LINED GATE VALVE
 2 Claims, 3 Drawing Figs.
[52] U.S. Cl. ..................................................... 137/375,
 251/328
[51] Int. Cl. ..................................................... F16k 27/00,
 F16k 3/02
[50] Field of Search ......................................... 137/375;
 251/326—329

[56] References Cited
 UNITED STATES PATENTS
 1,981,825  11/1934  Miller ........................... 137/375
 3,217,739  11/1965  LaValley et al. .............. 137/375
 Re24,735  11/1959  Williams ....................... 251/326
 3,081,974  3/1963   Traut ............................ 251/328X Primary Examiner—Henry T. Klinksiek
Attorney—Wolfe, Hubbard, Leydig, Voit & Osann ABSTRACT: A lined gate valve comprising a cast body having a sleeve passage, and a throat passage in perpendicular alignment with the sleeve passage. The valve further comprising preformed, corrosion-resistant throat and sleeve liner sections contiguous with and supported by the inner surface of the body material.

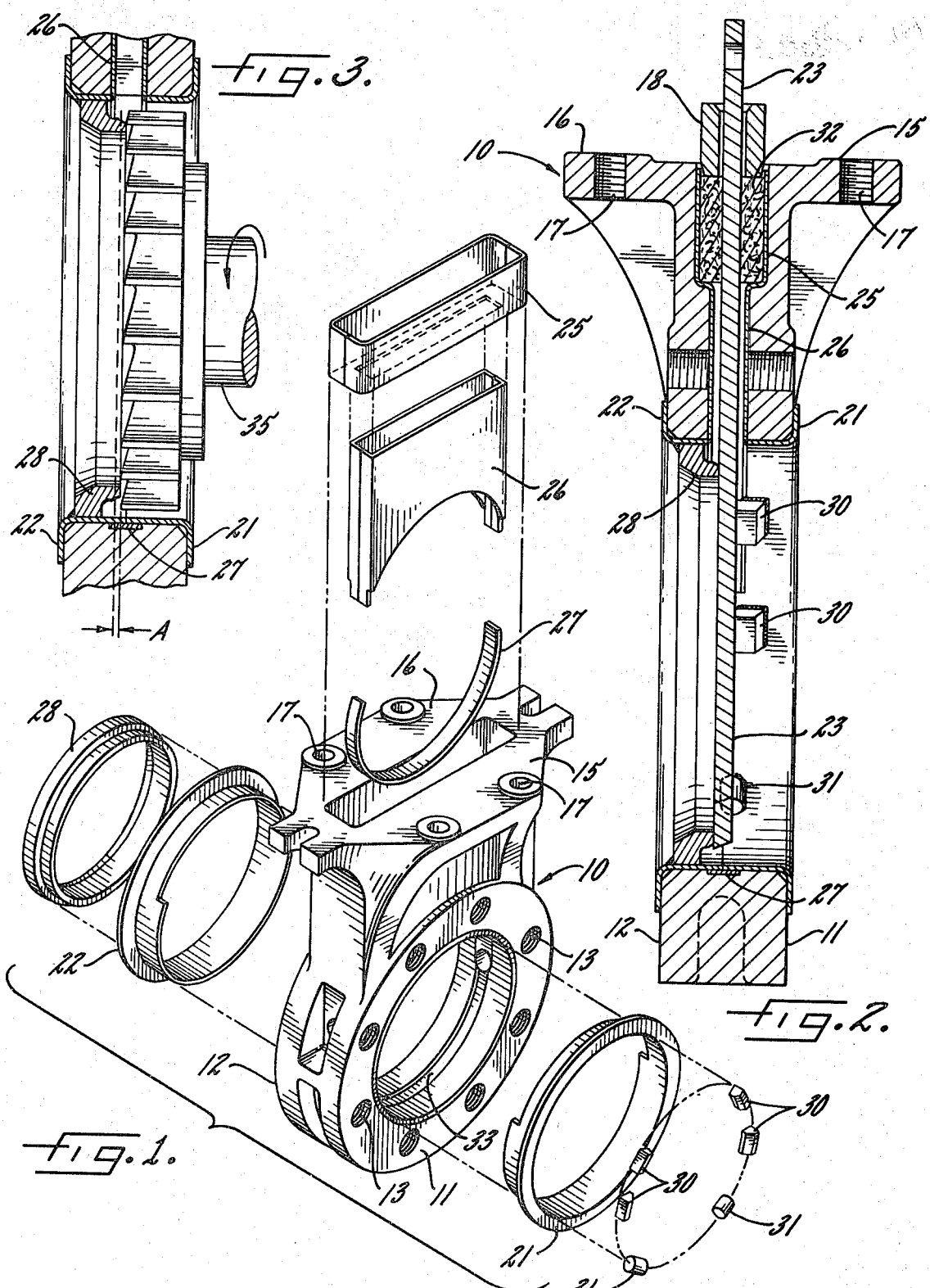

LINED GATE VALVE

This invention relates to gate valves, and in its principal aspect concerns a method of fabricating a corrosion-resistant lined gate valve in which the inner lining is entirely contiguous with and supported by the valve body.

Although gate valves as such have long been known in the art, the achievement of a high degree of corrosion resistance in such valves has often proved difficult. It is possible to make the valve entirely from corrosion-resistant material, such as stainless steel, but such a construction is uneconomically difficult and expensive. On the other hand, easily worked and inexpensive conventional metal body materials such as cast iron must be furnished with a lining or coating of some kind if the desired corrosion resistance is to be achieved.

Previous valve designs have used either a heavy self-supporting fabricated corrosion-resistant liner, or alternatively a thin corrosion-resistant material backed by a heavier load-bearing structure with a layer of deformable material sandwiched therebetween. Both of these techniques have disadvantages. The heavier, self-supporting lining is costly and makes inefficient use of the lining materials which are expensive and often difficult to work. In the alternative construction, having a thinner lining material, the use of a deformable backing material has been necessary to allow the lining to conform to the generally uneven surface of the cast valve body. Lead and plastic materials have been used as backing for the thin linings, but these materials introduce temperature restrictions to the uses to which the valve may be put.

In view of the foregoing, it is a principal object of the present invention to provide a new and improved method of gate valve construction, as well as a gate valve of improved design in which relatively thin shells of corrosion-resistant lining material may be utilized without the need to use deformable backing materials and without loss of strength.

It is also intended to provide an improved gate valve construction in which no operating adjustments are needed after assembly to assure positive alignment of the gate with its seat.

A further object is to provide a valve construction in which a series of valves may be easily provided from a single basic valve body unit. In this manner an entire line of valves having different pressure ratings may be produced from a single basic body unit.

Other objects and advantages of the invention will become apparent upon reference to the following specification and to the drawings, in which:

FIG. 1 is an exploded perspective view of a gate valve body unit exemplifying the present invention;

FIG. 2 is a vertical section of a completed gate valve utilizing the body of FIG. 1; and FIG. 3 is a partial section similar to FIG. 2 illustrating the action of a milling cutter in finish machining the valve seat.

Turning first to FIG. 1, there is shown in exploded form a valve body unit constructed according to the present invention. The entire assembly is contained within a cast valve body 10 having opposed, flat flanges with parallel attachment faces 11, 12 and which are provided with threaded bolt holes 13 for attachment purposes. At the top, additional cast flanges 15, 16 are provided having holes 17 for the attachment of a valve superstructure and actuating means (not shown), and a gland or follower 18 (FIG. 2).

The valve lining is made up of preformed sections of corrosion-resistant sheet material. The throat passage of the valve which communicates between the attachment faces 11, 12 is lined with a first throat liner section half 21 and a second throat liner section half 22, each having a peripheral flange extending outward and overlying its respective attachment face 11, 12. These liner flanges are sandwiched within the joint between the valve body 10 and similar flanges (not shown) on the pipes to which the valve is to be assembled. The sleeve passage, which lies perpendicular to the throat passage and which later receives a sliding gate 23, is lined with a stepped upper sleeve liner section consisting of an enlarged upper portion 25, and a lower portion 26 having a semicircular cutout adapted to fit corresponding gate notches in each of the throat sections 21, 22. The joint between the latter members is backed up by a semicircular backing strip 27 underlying the line of connection between the throat sections 21, 22, and wrapping about these sections to meet the lowermost edges of the lower sleeve section 26.

The remaining elements of the completed valve body unit include a preformed annular valve seat 28, gate guiding and retaining blocks 30, and gate stops 31. Packing 32 (FIG. 2), which is retained and compressed by the follower 18 within the upper sleeve section 25 in the usual manner, is added to complete the gate valve.

Pursuant to a principal feature of the invention, the valve construction of the present invention allows the lining of thin corrosion-resistant sheet material to be completely contiguous with the material of the cast valve body 10 throughout the entire inner surface area of the latter member. This is accomplished by first casting the valve body 10 with its sleeve passage being formed by a single casting core. The sleeve opening is thus smoothly finished and dimensionally accurate without parting lines or other surface defects. The throat passage is also cast with a similar core or cores, but need not be made as accurately or with the same degree of as-cast surface finish as the sleeve passage. As provided for by the invention, the smoothly cast sleeve passage is thereafter used as a reference from which the remaining finished portions of the valve body are located for final machining.

As a next step in the manufacturing process, the cast body 10 is positioned for machining of the throat passage in perpendicular alignment relative to its cast sleeve passage. The remaining finished surfaces, including the attachment surfaces 11, 12 are then machined, using either the cast sleeve passage or the now-finished throat passage for positional reference. The various attachment holes 13, 17 are desirably added at this time. Also machined is a circumferential slot 33 which will receive the backing strip 27.

With the machining of the body casting 10 completed, the preformed liner sections are assembled. The sheet metal sleeve liner section is assembled from its upper and lower components 25, 26 prior to assembly. Both it and the first and second throat sections 21, 22 are preferably stamped from sheet material. The two portions of the throat liner 21, 22, the backing strip 27 and the sleeve liner subassembly are then assembled to one another and to the body 10. While fabrication by welding is most desirable in the case of sheet material liners of stainless steel or the like, it will be appreciated that other fabrication techniques such as heat bonding and solvent welding may be used for other liner materials such as plastic. The throat passage having been finish machined into alignment with the sleeve passage, the throat liner sections 21, 22 are thus allowed to fit intimately against the body material and are substantially contiguous therewith over the entire throat area.

As the next step in fabrication, the preformed annular valve seat 28 is attached to its respective throat liner section 22, by welding to the liner section 22 or by other suitable means. To provide accurate seat alignment and as another feature of the invention, the valve seat 28 is intentionally made oversize with its gate-engaging face being unfinished. After assembly, the face is machined a distance A (FIG. 3) by a milling cutter 35 which is inserted from the opposite side of the valve body 10. The finishing cut on the face of the valve seat 28 is made with the now-lined body oriented in alignment with the sleeve passage in the same manner as was done in machining of the throat passage prior to assembly of the throat liner sections 21, 22. This technique causes the valve gate-engaging portion of the seat 28 to be precisely aligned with the sleeve through which the gate 23 will later be inserted. Thus it may be seen that no further alignment of the gate 23 after assembly is necessary, and the need for the adjustment apparatus commonly employed in previous gate valves is thereby eliminated.

As an alternative procedure, the valve seat 28 may be finish machined prior to assembly, and then located with respect to an inserted gate 23 prior to welding the seat in place. In this case, as with the technique in which the valve seat 28 is machined in place by a milling cutter 35, the alignment is taken directly from the sleeve passage through which the gate 23 will slide, and provision for further alignment is therefore unnecessary.

The valve is completed and made ready for use by simply adding the gate 23, packing 32 and follower 18. If desired, the gate guides 30 and gate stops 31 may be welded into position after the gate 23 has been assembled in place, thereby assuring the alignment and rigidity of these elements after assembly.

As a principal advantage of the invention, it will be seen that a range of gates of varying thickness and pressure capabilities may be utilized within the same basic valve body unit merely by varying the depth of the cut made on the valve seat 28 by the milling cutter 35, or installing the seat in a different axial position. If a relatively thick gate 23 is to be used, the seat is cut back or shifted a greater distance to accommodate the increased width. In this way any thickness of valve gate 23 can be centered within its sleeve, and no adjustment means is necessary.

It may be seen that a valve constructed according to the present invention enjoys the advantages of having the flow passage and sleeve passage contained within a single strong body unit. The packing chamber, being cast with single core, can be lined with a suitable stepped liner section without further machining because of the dimensional accuracy achievable with such a casting process. The corrosion-resistant liner may be made as thin as desired in keeping with the technique of fabrication used, and is solidly backed over its entire area throughout the interior surfaces of the valve. The resulting valve uses a minimum of the relatively expensive corrosion-resistant material while sacrificing nothing in strength. In addition, no deformable backing material is required to add to the cost and complexity of the valve, and which might introduce temperature limitations in use.

The use of a cast body in combination with preformed sheet material liner sections allows a choice of materials and combinations of materials which is greatly expanded over anything over previously possible in the gate valve art. All that is required is that the liner sections be bondable to one another, since it is unnecessary that they be bonded to the valve body itself to withstand pressure forces from within the valve. It is only necessary that the liner section 22 which retains the valve seat 28 be sufficiently strong to resist pressure forces in the downstream direction when the valve is closed.

Variation of the valve construction to accommodate increased pressure ratings requires only the use of a thicker gate 23. The body 10 is generally much stronger than any gate which would be used in normal service, and since the liner material is backed up over its entire surface by the body, the completed body unit is sufficiently strong for use with any practical thickness of gate 23 without change or additional reinforcement. The basic body unit may thus be the same for all pressure ratings, providing considerable economic advantages in producing a full range of valves of varying pressure ratings.

I claim:
1. A lined gate valve comprising, in combination:
   a valve body having parallel attachment faces, a perpendicular sleeve opening, and a throat communicating between the attachment faces in perpendicular alignment with the sleeve opening;
   a corrosion-resistant sheet material liner substantially contiguous with the valve body over its internal surface, said liner consisting of connecting sections fabricated together to form a continuous liner unit comprising a stepped upper sleeve liner section having an enlarged upper portion adapted to enclose a packing chamber, a connecting sleeve liner section, and first and second throat liner halves each having a integral peripheral flange adapted to overlie one attachment face of the valve body;
   a slidable gate received within the lined sleeve opening for entry into the lined throat, and gate-packing means adjacent the sleeve;
   an annular seat attached to the inner periphery of the lined throat section and having a gate-engaging face aligned with the sleeve opening for sealing engagement with the gate; and
   gate guiding and retaining means carried within the lined throat opposite the seat.

2. A lined gate valve as defined in claim 1 having a semicircular backing strip underlying the line of connection between the throat liner halves and wrapping about the throat liner sections to meet the lower edges of the connecting sleeve liner section.